J. L. HECHT.
CONTROLLING DEVICE FOR AUTOMOBILES.
APPLICATION FILED OCT. 31, 1913.
1,204,014.
Patented Nov. 7, 1916.
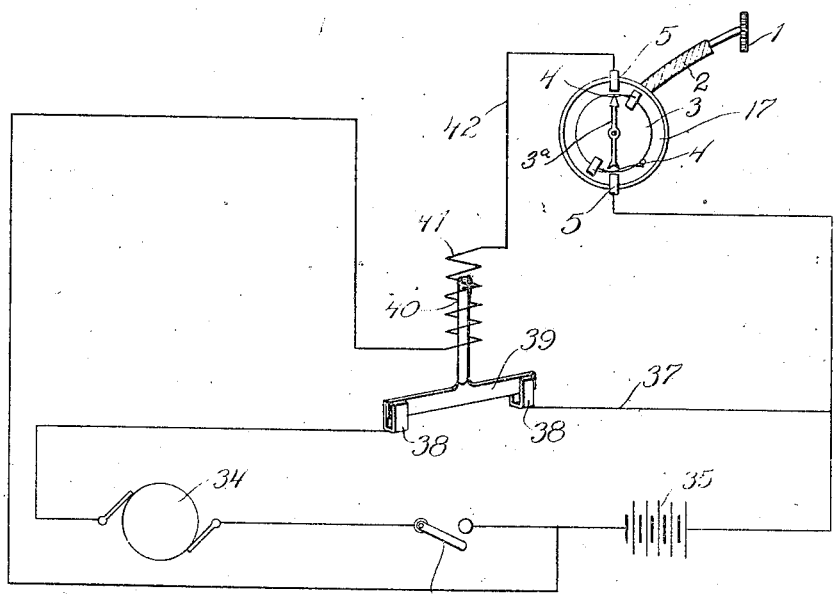

UNITED STATES PATENT OFFICE.

JULIUS L. HECHT, OF EVANSTON, ILLINOIS, ASSIGNOR OF ONE-HALF TO EDMUND O. SCHWEITZER, OF CHICAGO, ILLINOIS.

CONTROLLING DEVICE FOR AUTOMOBILES.

1,204,014. Specification of Letters Patent. Patented Nov. 7, 1916.

Application filed October 31, 1913. Serial No. 798,432.

*To all whom it may concern:*

Be it known that I, JULIUS L. HECHT, a citizen of the United States, residing at Evanston, in the county of Cook and State of Illinois, have invented a certain new and useful Improvement in Controlling Devices for Automobiles, of which the following is a full, clear, concise, and exact description, reference being had to the accompanying drawings, forming a part of this specification.

My invention relates to controlling devices for automobiles, and has for its object the provision of an improved device which is responsive to the speed of the automobile, and which electrically prevents the driving of the car beyond a certain predetermined speed.

In one of the forms of my invention, I use a speed responsive device which when a predetermined speed has been reached, renders inoperable some part of the motor mechanism of the machine as for instance by opening the circuit of the driving motor in the case of an electrically operated vehicle. I will describe this embodiment of my invention more in detail by referring to the accompanying drawings, in which the single figure of the drawings illustrates diagrammatically an embodiment of my invention in an electric vehicle.

Referring more particularly to the figure, I show diagrammatically an automobile wheel 1 which through the agency of the flexible shaft 2 controls the position of a rotating speed responsive element 3. The mechanism interposed between the flexible shaft 2 and the element 3 is not shown as it may be of any suitable form so that the element 3 changes its angular position in accordance with the change of speed of the wheel 1. A pointer 3ª movable conjointly with this speed responsive device 3 may indicate to the operator of the car the speed at which it is traveling. This speed responsive element 3 has a pair of contacts 4, 4 adapted after having rotated clockwise a predetermined distance to close the circuit through coöperating contacts 5, 5. When this circuit is thus closed the operating circuit of the vehicle is rendered ineffective as will be described.

The vehicle is provided with a motor 34 adapted to be operated from a storage battery 35 through the interposition of a suitable controller shown diagrammatically at 36. This circuit from the storage battery to the motor includes a conductor 37. This conductor is provided with switch elements 38, 38 adapted to be controlled by a movable switch element 39. The movable switch element is attached to a plunger 40 of a solenoid 41, which solenoid 41 is included in circuit with a conductor 42 under the control of the speed responsive element 3. This conductor 42 together with the solenoid 41 may receive its current from the storage battery 35 as will be clear from the illustration. Now whenever the speed exceeds the critical limit, then the solenoid 41 is energized to attract its plunger 40, thereby to open the circuit through the storage battery and motor, thus to prevent the supply of further current to the prime mover of the device, and hence to check the speed of the vehicle.

It is to be noted that the starting current drawn by the motor 34 from the battery 35 may attain very high values. It is therefore essential that the switch 38, 39 be made of substantial construction and of relatively large capacity in order to carry the heavy current without injury or deterioration. The solenoid 40 which is employed to operate the switch is made powerful enough to open the switch quickly and positively and is connected directly across the battery 35 when the contacts 4, 5 are closed. In this manner a reliable but simple control is provided. The speed controlled element 3 is free of frictional engagement up to the point when the contacts 4, 5 close the control circuit. This permits the instrument 17 to operate with precision up to the point of exercising control after which the speed drops in normal operation due to the absence of driving power. The provision of the member 3 independent of the pointer 3ª permits of sufficient current passing through the contacts 4, 5, to operate the solenoid 40 and the control switch 38, 39, in a definite positive manner without injuring the pointer 3ª.

From what has been described it will be seen that I have provided simple and efficient electrically controlled means to prevent undue speed of a self-propelled electric vehicle or the like. It is of course obvious that many changes and modifications may be made without departing from the spirit of the invention as herein disclosed and set forth.

Having however thus described several embodiments which my invention may take, what I claim as new and desire to secure by Letters Patent is:

An electric vehicle having an electric motor, a storage battery for supplying current to said motor, a solenoid operable from said storage battery for controlling the circuit from said storage battery to said motor, said solenoid having a plunger, a speedometer having a pointer movable in accordance with the change of speed of said vehicle, contact elements to control the circuit through said solenoid, and a movable contact element electrically independent of said pointer, but movable conjointly therewith and normally without frictional engagement save when it moves into position to control the circuit through said first aforesaid contact elements.

In witness whereof, I hereunto subscribe my name this 25th day of October, A. D. 1913.

JULIUS L. HECHT.

Witnesses:
A. L. JONES,
HAZEL ANN JONES.